June 27, 1939.  J. W. DYER ET AL  2,163,728
AIRCRAFT
Filed July 27, 1936   3 Sheets-Sheet 1

June 27, 1939.  J. W. DYER ET AL  2,163,728
AIRCRAFT
Filed July 27, 1936   3 Sheets-Sheet 2

INVENTOR
John William Dyer & David Kay
BY
ATTORNEY

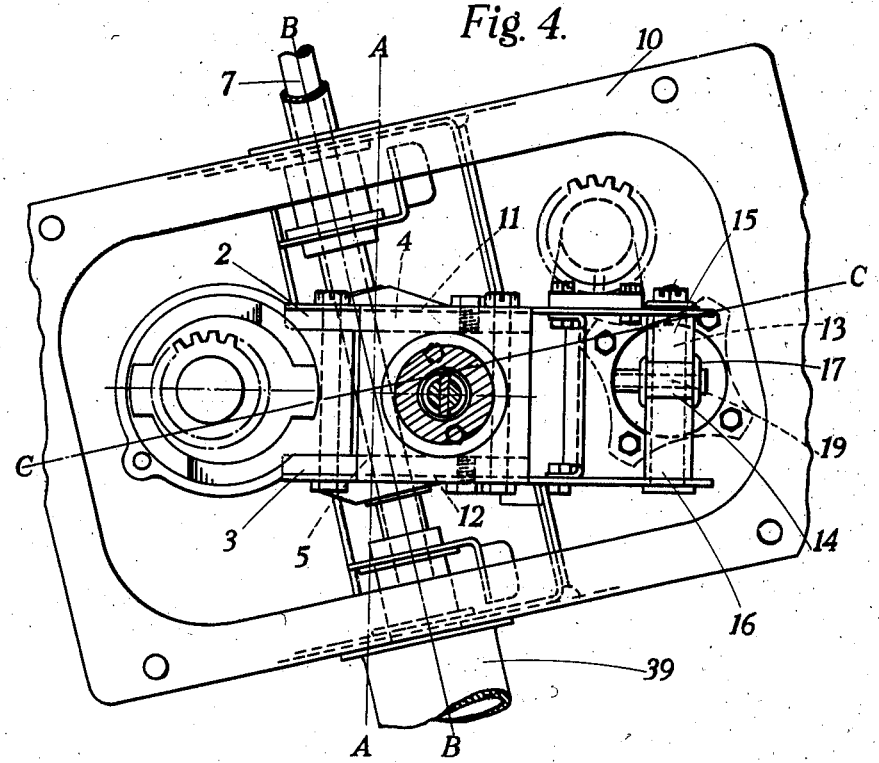

Patented June 27, 1939

2,163,728

UNITED STATES PATENT OFFICE 2,163,728

AIRCRAFT

John William Dyer, Netley Abbey, Southampton, England, and David Kay, Edinburgh, Scotland, assignors to Kay Gyroplanes Limited, Edinburgh, Scotland Application July 27, 1936, Serial No. 92,914
In Great Britain July 31, 1935

21 Claims. (Cl. 244—18)

Application for a patent has been made in Great Britain No. 21,761 filed July 31st, 1935.

This invention relates to aircraft of that type which is sustained in flight wholly or partly by an overhead system of blades or wings rotatably mounted upon a vertical or substantially vertical supporting member or mast, the said system being commonly referred to as a "rotor". The invention is particularly applicable to the above mentioned type of aircraft in which the rotor is auto-rotative, i. e., is turned in flight under the action of the flight wind, although it is applicable to rotors which are or may be driven during flight.

It is already known to effect or assist the banking of such aircraft for a turn by mounting the rotor in such a manner that it is capable of being tilted laterally of the aircraft in either direction and it is also known to provide for the inclination of the rotor in a fore-and-aft direction to enable the trim of the aircraft to be changed in flight.

Practical constructional considerations, however, necessitate having the pivot about which the rotor tilts laterally or laterally and longitudinally below the centre of the rotor hub and, consequently, when the rotor is inclined laterally across the aircraft, the hub is moved bodily across the machine in the direction of tilt. This is disadvantageous, since it partly defeats the object of tilting the rotor, for the following reason. The aircraft itself tends to follow the angle of inclination of the "disc" (i. e., the average plane of rotation of the rotor blades) when the rotor is tilted. The centre of lift of the rotor system may be considered as being substantially at the centre of the rotor hub and, therefore, assuming that the rotor is tilted to the right, the machine tends to bank to the right also, but the centre of gravity of the machine is now to the left of the point of support, i. e., to the left of the centre of lift. The effect of this is that the machine tends to bank to the left and the resulting attitude which the machine will take up is governed by the balance of the two conditions.

The principal object of the present invention, therefore, is to overcome the above mentioned disadvantage present in known rotor systems.

According to the present invention, therefore, in an aircraft of the type referred to, the rotor-supporting member or mast is mounted and arranged in such a manner that when the member is tilted laterally or laterally and longitudinally, the point of support or pivot of the member is moved relative to the aircraft with the object of keeping the centre of lift of the rotor system in the same position or substantially in the same position relative to the centre of gravity of the aircraft or with the object of varying the position of the centre of lift relative to the centre of gravity by any predetermined amount.

Thus, an aircraft of the type referred to may be characterised by the feature that when the rotor is tilted laterally (or laterally and also in a fore-and-aft direction if such a combination of movements is used) the point of support or pivot of the rotor-supporting member is moved transversely of the aircraft in a direction opposite to that in which the rotor has been tilted, so that when the rotor is tilted, the position of the rotor hub relative to a longitudinal vertical plane passing through the centre of gravity of the aircraft can be made to remain unchanged or substantially unchanged or can be varied as required. From this it follows that if the rotor-supporting member is tilted to the right, for example, the centre of lift of the rotor will be transferred to the left and the relative positions of the centre of lift and the centre of gravity of the aircraft will remain unchanged or substantially so, or altered by a predetermined amount as required.

The amount of the lateral movement of the point of support of the rotor-carrying member can be equal to or greater or less than the lateral movement of the rotor hub. It will probably be found most convenient, however, to make the two lateral movements equal, so that when the rotor-carrying member is tilted to the right, for example the centre of gravity of the machine cannot be to the left of the centre of lift and, therefore, there will be no force opposing the banking of the machine to the right and the full benefit of tilting the rotor is obtained. Quite obviously the ratio of the lateral movement of the point of support to the amount of tilt can be made adjustable initially or in flight if desired.

There are, of course, many methods in which the point of support of the rotor-carrying member can be displaced laterally, depending upon the manner in which the rotor-carrying member is supported and the application to known rotor systems will be obvious to those skilled in the art.

For instance, the rotor support may be mounted upon a member which is supported upon the aircraft in such a manner as to be capable both of turning and axial movement, the arrangement being such that when said member is turned to bring about the lateral (or lateral and fore and aft) tilting of the rotor, the said member and, therefore, the rotor support are simultaneously moved transversely of the aircraft, whereby the position of the rotor hub relative to a longitudinal vertical plane passing through the centre of gravity of the aircraft can be made to remain unchanged or substantially unchanged during the tiling movement or can be made to alter as required.

It will be found convenient, for example, to use this invention in conjunction with a rotor-carrying member supported in the manner described in the specification of patent application No. 33,395, for simultaneous lateral and fore-and aft tilting. In one construction according to the said specification, the rotor-carrying mast is supported for both lateral and fore-and-aft movement upon the crank pin or equivalent of a hinge-pin or Z crank member, the mast being anchored to a structure carrying the rotor-system by means of a link, the point of attachment of which to the mast being offset from the axis about which the mast can tilt longitudinally and also from the axis about which the mast can tilt laterally. In the application of the present invention to the above construction, it is only necessary to provide means whereby when the axle or equivalent of the hinge-pin or Z crank member is turned to tilt the mast laterally and slightly longitudinally, said axle or equivalent will be caused simultaneously to move axially laterally of the aircraft in the opposite direction to the lateral bodily movement of the rotor hub that would have taken place due to tilting. This can be arrived at very simply as follows.

The Z crank axle is supported in such a way that in addition to turning it can also slide axially in its bearings. To do this, one end of the axle at the outside of the adjacent bearing is provided with a cross-head pin, the ends of which are engaged in helical slots formed in a sleeve secured to the side wall of the structure supporting the rotor system, the "hand" of said slots being such that as the axle and consequently the crank pin member or barrel are turned, the axle will move axially in its bearings in a direction opposite to that in which the mast has been tilted laterally by virtue of the turning of the Z crank member and will, of course, carry with it the crank pin member or equivalent. Suitable means, such as distance tubes, are provided for locating the barrel of the Z crank on its axle and in this particular construction the pitch of the helical slots is such that the axial movement of the barrel is equal to the lateral bodily displacement of the rotor hub due to the tilting of the mast.

In the arrangement described in the above mentioned specification, the upper end of the said anchoring link is connected to a trunnion block mounted on a cross pin extending across side cheeks extending rearwardly at the lower end of the mast. A further feature of this invention consists in allowing for the position of the trunnion on the cross pin to be varied. If the trunnion block is in any but a central position, the end load on the anchoring link will cause the rotor mast to have a tendency to tilt either to port or to starboard, whereby the lateral control of the aircraft can be given a bias, the extent and direction of which is governed by the distance from and which side of its central position the trunnion block is offset. Obviously, such an arrangement will obviate the necessity of using springs for biassing the lateral control.

The bias can be varied in flight. For example, the said cross pin could be screw-threaded and turned by any convenient form of remote control in the cockpit.

One constructional form of the invention is shown, by way of example, on the accompanying sheets of drawings, which also include diagrammatic views of aircraft illustrating the action of the invention.

On the drawings:—

Fig. 4 is a top plan view corresponding to Fig. 3 and partly in section;

Fig. 5 is a transverse section on the line B—B in Fig. 4;

Figure 1:
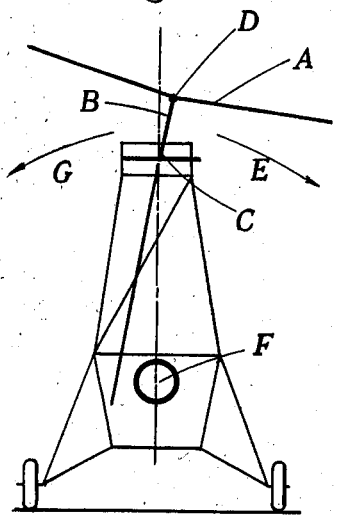
Fig. 1 is a diagrammatic view of an aircraft of the type referred to and shows the rotor, which is supported in known manner, tilted to starboard.

Referring first to Fig. 1, the rotor A is shown to be supported on a rotor-support or mast B, which can be tilted laterally across the aircraft about its lower end C. As shown in the figure, the rotor support is tilted to starboard and, as the pivot about which the rotor tilts is below the centre D of the rotor hub, the latter is moved bodily across the machine in the direction of the tilt. The "rotor disc" (i. e., the average plane of rotation of the rotor blades) is inclined as shown in Fig. 1, and, as mentioned above, the aircraft itself tends to follow the angle of inclination of the "rotor disc" and to bank to starboard as indicated by the arrow E. The centre of lift of the rotor system, however, may be considered as being substantially at the centre D of the hub. Therefore, when the rotor is tilted to starboard, the centre of gravity F of the aircraft is to the left of the centre D of the hub, i. e., to the left of the centre of lift. The effect of this is the setting up of an unbalanced couple which tends to cause the aircraft to bank to port, as indicated by the arrow G. The resulting attitude which the aircraft will take up is governed by the balance of the two conditions. The effect is disadvantageous, since not only does the control for tilting the rotor act sluggishly but, in some conditions of flight, the effect may even be dangerous.

Although the invention may be applied to rotors tilted in various ways, it will be convenient to describe the invention specifically with reference to a rotor mounted on a rotor mast supported at its lower end in the manner described in the specification of our patent application No. 33,395.

Figure 3:
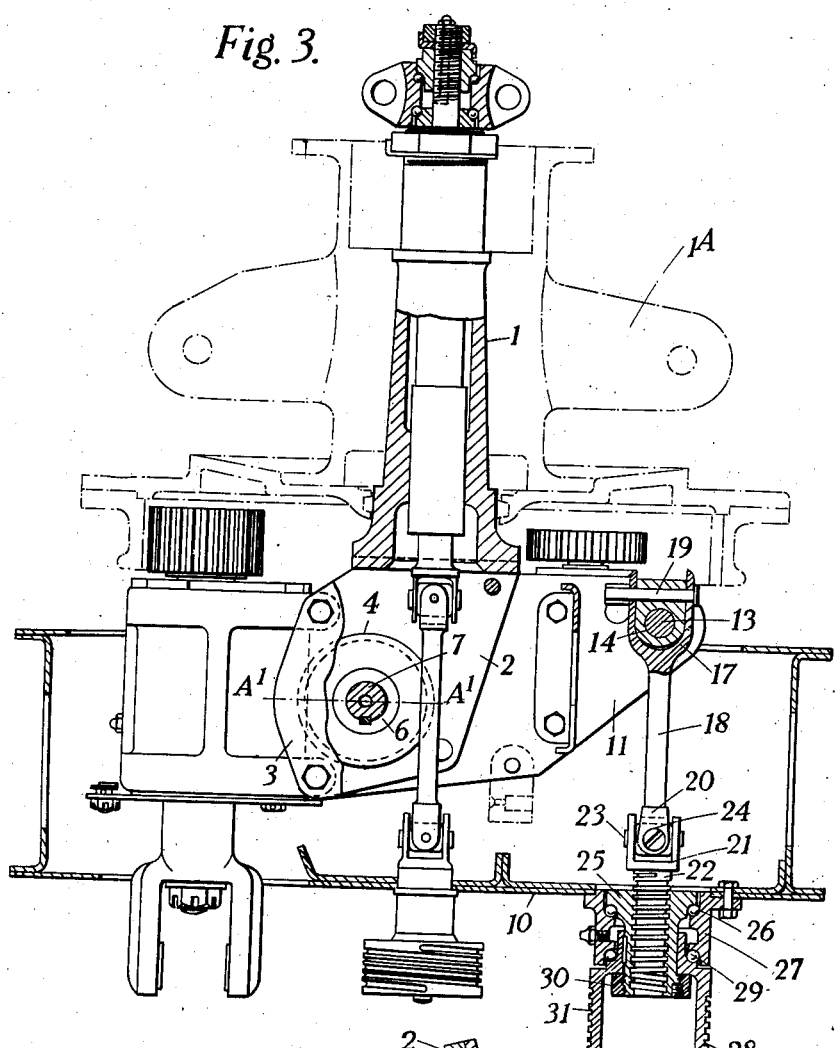
Fig. 3 is an elevation, partly in section, of one form of rotor-supporting mast and its associated mechanism.
Figure 6:
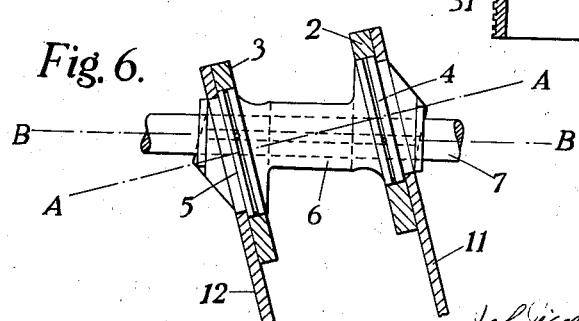
Fig. 6 is a fragmentary view, partly in section, illustrating the mounting of the mast upon the Z-crank member.

Referring, therefore, to Figs. 3 to 7a, it will be seen that in this specific construction, the hollow rotor-supporting mast 1 upon which the rotor hub 1A is turnable is forked at its lower end and provided with two downwardly-depending lateral cheeks 2 and 3 which are journalled, respectively, upon the bearing parts 4 and 5 of a hinge-pin or Z-crank barrel 6 keyed upon the Z-crank axle 7. The latter is journalled in bearings 8 and 9, Fig. 5, supported in the side cheeks of the rotor-supporting bracket 10 which is mounted upon a pylon structure (not shown) extending upwards from the fuselage. As will be seen from Fig. 4, the axis A—A of the coaxial parallel bearing parts 4 and 5 of the Z crank barrel is inclined to the axis B—B of the Z crank axle 7 and, this being the case, either the axis of the barrel 6 or the axis of the axle 7 can be arranged at right angles to the centre line C—C of the aircraft but it is preferred to arrange the axis of the axle at right angles to the centre line C—C, since the longitudinal tilting of the mast 1 will then take place along a line inclined to the centre line of the machine and, consequently, the unbalancing of the lift due to the variation in the angles of incidence of any laterally extending blades will be compensated, at least to some extent, by the shifting of the rotor centre with respect to the centre of gravity of the aircraft. Side plates 11 and 12 are secured, respectively, to the side cheeks 2 and 3 and extend rearwardly of the mast 1 as shown in Figs. 3, 4 and 5, and at their rear ends are interconnected by a pin 13 upon which a pivot block 14 is pivotally mounted, said block being flanked on opposite sides by distance tubes 15 and 16. The forked end 17 of a link 18 embraces the block 14 and is secured thereto by a pin 19 passing through the arms of the fork and through the said block. The lower end of the link 18 is also forked at 20 and is connected for universal movement to the forked upper end 21 of a spindle 22 by means of the cross pins 23 and 24, the shank of the spindle being screwed, as shown in Fig. 3, into a correspondingly screw-threaded drum 25. The upper end of the latter is rotatably mounted by ball bearings 26 in a bearing housing 27 which is secured to the exterior of the base of the rotor-supporting bracket 10, the upper end of a cable drum 28 being keyed to the lower end of the drum 25 and rotatably arranged in the interior of the bearing housing by means of the lower ball-bearings 29. Thus, the drum 25 and drum 28 can turn as a unit within the bearing housing 27 but they are fixed against axial movement relative to the housing by means of a nut 30 which is screwed upon the bottom end of the drum 25. The drum 28 is provided with grooves 31 for the reception of an operating cable.

As previously mentioned, the side cheeks 2 and 3 of the mast 1 are pivotally mounted upon the bearing parts 4 and 5 of the barrel 6 of the Z crank. Consequently, the link 18, through the mechanism described above, forms means for anchoring the mast to the rotor-supporting bracket 10 and it also forms a link in the chain of mechanism for adjusting the fore-and-aft inclination of the mast initially, which operation can be carried out from the cockpit through the said cable control. Since the link 18 is offset, as described in the specification of application No. 33,395, the mechanism, of course, will also cause a slight fore-and-aft movement of the mast to take place simultaneously with the lateral movement.

The Z crank, constituted by the axle 7 and the barrel 6 having its axis A—A inclined to that B—B of the axle, is of course one constructional form of the Z crank or hinge-pin member described and claimed in Patent No. 1,750,778 granted to one of the present applicants as being used for varying the angles of incidence of airscrews, revolving blades or wings and propellers. In its present application to the lateral tilting of the rotor hub 1A, however, the horizontal or substantially horizontal plane in which the axis A'—A' of the Z crank barrel 6 is disposed when in the midposition is at right angles to the axis of the mast 1, see Fig. 3. Thus, to obtain the lateral tilting of the mast 1 it is only necessary to turn the Z crank axle 7, the mast at the same time being caused, by the mechanism referred to above to tilt slightly in a fore-and-aft direction about the common axis of the bearings 4 and 5 of the Z crank barrel 6.

The fore-and-aft inclination of the mast 1 can obviously be varied by turning the pulley 28 and thereby raising or lowering the rear ends of the plates 11 and 12 and turning the mast about the common axis of the Z crank barrel 6.

Figure 7:
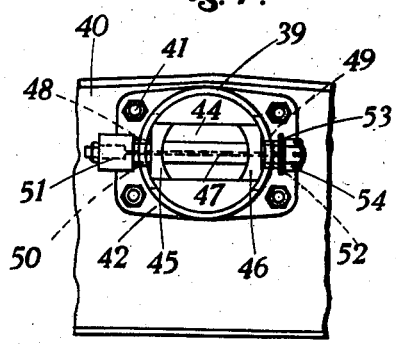
Fig. 7 is a view on the port side of the aircraft of the helical sleeve assembly.
Figure 7A:
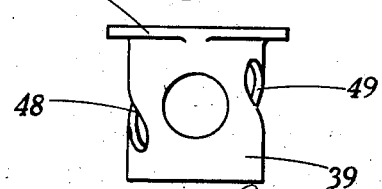
Fig. 7a is a plan view of the sleeve.

Referring now more particularly to Figs. 5, 7 and 7ª, it will be seen that the crank barrel 6 is positioned between washers 31 and 32 arranged at the inner ends, respectively, of two distance tubes 33 and 34, which are slidable and turnable in the bearings 8 and 9. The outer end of the distance tube 33 fits against a plate 35 fixed on the axle 7 behind a control lever 36 keyed on the axle and held thereon against axial movement by nuts 37 and 37ª, the outer end of the distance tube 34 fitting against a shoulder 38 formed on the end of the axle. A sleeve 39 is secured on the port side wall 40 of the bracket 10 by means of bolts 41 passing through a flange 42 integral with the sleeve. The end of the axle 7 within the sleeve 39 is hollowed out at 44 and is formed with lateral flanges 45 and 46 drilled with coaxial holes to receive a pin 47 which extends transversely across the sleeve through oppositely helical inclined slots 48 and 49 formed in the wall of the sleeve. A hollow roller 50 is arranged between the flange 45 and a head 51 formed on the pin, a further hollow roller 52 being provided on the pin between the flange 46 and a washer 53, which is held in position by a nut 54 screwed on to the end of the pin. The rollers 50 and 52 are respectively engaged in the helical slots 48 and 49 in the sleeve 39.

The "hand" of the helical slots is such that as the axle 7 and, consequently, the crank pin barrel 6 are turned through the lever 36, the axle will also move axially in its bearings 8 and 9 in a direction opposite to that in which the rotor support has been tilted by virtue of the turning movement of the barrel 6 and will, of course, carry the latter and the lower forked end of the rotor support 1 with it. When, for instance, the axle 7 is turned through the control lever 36 so as to give the rotor support 1 its maximum tilt to starboard, the pin 47 will occupy its highest position in the helical slot 48 and its lowest position in the helical slot 49.

In this particular construction, the pitch of the helical slots is such that the lateral movement of the barrel is equal to the transverse bodily displacement of the rotor hub 1A due to the tilting of the rotor support 1.

Figure 2:
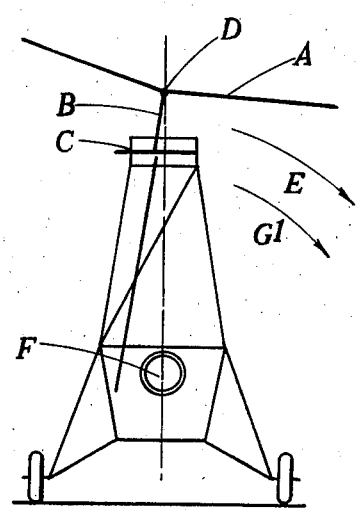
Fig. 2 is a similar view of an aircraft of the same type but having a rotor supported for simultaneous lateral tilting and lateral bodily displacement according to the present invention.

The action of the mechanism is shown diagrammatically in Fig. 2. Referring to that figure, it will be seen that, as in Fig. 1, the rotor support B has been tilted to starboard. It will be noted, however, that the pivot C at the lower end of the support has, during the turning movement of the axle 7, been shifted simultaneously to port, with the result that the centre D of the rotor A is now directly on the vertical longitudinal plane passing through the centre of gravity F of the aircraft. By virtue of the inclination of the rotor, the aircraft again tends to bank to starboard, i. e., in the direction indicated by the arrow E and, since the position of the centre of lift of the rotor system relative to the centre of gravity of the aircraft has not been substantially altered during the tilting movement, no unbalanced couple will be set up opposing the banking of the aircraft.

Still referring to Figure 2, the amount of the lateral movement of the point of support C of the rotor-carrying member B can be equal to or greater or less than the lateral movement of the rotor hub D. It will probably be found most convenient, however, to make the two lateral movements equal as described above, so that when the rotor-carrying member is tilted to starboard, for example, the centre of gravity F of the machine cannot be to the port side of the centre of lift and, therefore, there will be no force opposing the banking of the machine to starboard and the full benefit of tilting the rotor will be obtained. Quite obviously, the amount of the lateral movement of the point of support can be made adjustable if so desired.

In certain cases, however, it may be desirable to arrange for the rotor hub D and, therefore, the centre of lift of the rotor system to be transferred to the same side of the centre of gravity F of the aircraft as the point of support C, so as actually to set up a useful unbalanced couple acting, as indicated by the arrow G' in Fig. 2, in a direction to assist the banking of the aircraft. By suitably proportioning the ratio of the lateral sliding movement of the point of support C to the amount of inclination of the rotor support B various results may be obtained to suit the characteristics of different aircraft and different flying conditions.

It will, of course, be understood that when the rotor support B is tilted for a bank to port, the point of support C and the axle 7 will be moved to starboard, the pin 47, Fig. 5, moving in the opposite direction in the helical slots 48 and 49.

There are, of course, many methods by which the point of support of the rotor-carrying member can be displaced laterally, depending upon the manner in which the rotor-carrying member is supported and the application to known rotor systems will be obvious to those skilled in the art.

Referring to Figs. 3 and 4, as described in application No. 33,395 the position of the block 14 on the pin 13 can be varied within reasonable limits by varying the lengths of the distance tubes 15 and 16. If the block is in any but a central position, the end load on the anchoring link 18 will cause the rotor support 1A to have a tendency to tilt either to port or to starboard, whereby the lateral control of the aircraft may be given a bias, the extent and direction of which is governed by the distance from and to which side of its central position, the block is offset. Obviously, such an arrangement will obviate the necessity of using springs for biasing the lateral control.

The bias can be varied in flight. For example, the cross pin 13 could be screw-threaded and turned by any convenient form of remote control in the aircraft.

Having now particularly described and ascertained the nature of our said invention and in what manner the same is to be performed, we declare that what we claim is:

1. An aircraft of the type described comprising a rotor supporting member tiltable about its point of support, means for tilting the rotor supporting member, and means responsive to the movement of said tilting means to move the point of support of the rotor supporting member to vary the degree of shift in the position of the center of lift of the rotor caused by the tilting.

2. An aircraft of the type described comprising a rotor supporting member tiltable about its point of support, means for tilting the rotor supporting member laterally, and means responsive to the movement of said tilting means to move the point of support of the rotor supporting member in a direction opposite to the direction of tilt a distance sufficient to maintain substantially unchanged the position of the hub of the rotor with respect to a longitudinal vertical plane passing through the center of gravity of the aircraft.

3. An aircraft as claimed in claim 2, wherein the rotor supporting member is tilted laterally and simultaneously in a fore-and-aft direction.

4. In an aircraft of the type referred to, a shaft turnably and slidably mounted in said craft, a rotor support mounted on said shaft for axial movement of its point of support therewith, means for translating turning movement of said shaft into a tilting movement of the rotor support, and means for translating turning movement of the shaft into turning and axial movement of the shaft and axial movement of the point of support of the rotor support.

5. In an aircraft of the type referred to, a transverse shaft turnably and slidably mounted in said craft, a rotor support mounted on said shaft for axial movement therewith, means for translating turning movement of said shaft into a tilting movement of the rotor support, and means for translating turning movement of the shaft into a combined turning and axial movement of the shaft.

6. An aircraft, as claimed in claim 4, in which the shaft is arranged to be moved axially during its turning movement by cooperation with an inclined fixed surface.

7. An aircraft, as claimed in claim 4, in which the motion translating means are arranged and proportioned to shift the point of support of the rotor support transversely by an amount substantially equal to the lateral movement of the center of lift of the rotor due to the tilt with respect to the pivotal point of the tilting movement.

8. An aircraft, as claimed in claim 1, in which the means responsive to the movement of said tilting means is proportioned and arranged to move the center of lift of the rotor when the rotor support is tilted to the side of the center of gravity of the aircraft on which is situated the point of attachment of the rotor supporting members to the craft.

9. An aircraft, as claimed in claim 1, in which the means responsive to the movement of said tilting means is proportioned and arranged when the rotor support is tilted to move the centre of lift of the rotor to the opposite side of the centre of gravity of the aircraft on which is situated the point of attachment of the rotor supporting member to the aircraft.

10. An aircraft of the type referred to comprising an axle shaft turnably and slidably mounted in a fixed part of the aircraft, a Z-crank member on the shaft, a rotor support or mast carried on said Z-crank for tilting movement of the rotor mast in response to turning movement of the Z-crank with the shaft, a rotor rotatably mounted on said mast, a cam connection between said shaft and a fixed part of the craft arranged to translate turning movement of the shaft into a combined turning and axial movement of the shaft, and means for turning the shaft.

11. An aircraft, as claimed in claim 10, in which the cam connection comprises a cross pin fixed to the shaft and arranged to engage oppositely inclined slots in a fixed part on the aircraft.

12. An aircraft as claimed in claim 10, having anchorage means connected with a fixed part of the aircraft and with said rotor support for anchoring the latter to said fixed part and for causing the rotor to be tilted fore-and-aft simultaneously with the lateral tilting of the rotor caused by turning the axle shaft.

13. An aircraft, as claimed in claim 9, having means for adjusting the point of connection between the anchorage means and the rotor support.

14. An aircraft of the type referred to, comprising means for tilting the rotor support laterally about its point of support and means operatively interconnected with said tilting means to move the point of support of the rotor support relative to the aircraft in unison with the tilting movement in a direction and to an extent sufficient to maintain the centre of lift of the rotor system in the same position relative to the centre of gravity of the aircraft.

15. An aircraft of the type referred to, comprising means for tilting the rotor support laterally, means operatively interconnected with said tilting means for causing the rotor support to move simultaneously in unison with the tilting to move simultaneously in a fore-and-aft direction and means operatively interconnected with said tilting means for simultaneously moving the point of support laterally of the rotor support relative to the aircraft in unison with the tilting movement so that when said support is tilted the centre of lift of the rotor system is kept substantially in the same position relative to the centre of gravity of the aircraft.

16. An aircraft of the type referred to comprising means for tilting the rotor support laterally and means operatively interconnected with said tilting means for simultaneously moving the point of support of the rotor support laterally relative to the aircraft so that when said support is tilted the position of the rotor hub relative to a longitudinal vertical plane passing through the centre of gravity of the aircraft is varied in unison with said tilting means.

17. An aircraft of the type referred to, comprising means for tilting the rotor support laterally, means operatively interconnected with said tilting means for causing the rotor support to move simultaneously in a fore-and-aft direction and means operatively interconnected with said tilting means for simultaneously moving the point of support laterally of the rotor support relative to the aircraft in unison with the tilting movement so that when said support is tilted the position of the rotor hub relative to a longitudinal vertical plane passing through the centre of gravity of the aircraft is varied in unison with said tilting means.

18. An aircraft of the type described comprising a rotor supporting member tiltable about a pivotal point spaced below the center of lift of the rotor, means for tilting the rotor supporting member laterally of the aircraft, and means responsive to the movement of said tilting means to move the pivotal point of the rotor supporting member transversely of the aircraft by an amount substantially equal to the lateral movement of the center of lift with respect to the pivotal point due to the tilt.

19. An aircraft as claimed in claim 1, wherein the rotor supporting member is tilted laterally and simultaneously in a fore-and-aft direction.

20. An aircraft of the type described comprising a rotor supporting member, means for tilting the rotor supporting member, and means responsive to the movement of said tilting means to move the rotor supporting member to vary the degree of shift in the position of the center of lift of the rotor caused by the tilting.

21. An aircraft of the type described, comprising a rotor supporting member, means for tilting the rotor supporting member laterally, and means responsive to the movement of said tilting means to move the rotor supporting member in such a direction and to a distance sufficient to maintain substantially unchanged the position of the hub of the rotor with respect to a longitudinal vertical plane passing through the center of gravity of the aircraft.

DAVID KAY.
JOHN WILLIAM DYER.